May 19, 1936. H. L. SHAPARD 2,041,573
TEMPERATURE GENERATING AND CONTROL SYSTEM
Filed June 3, 1935
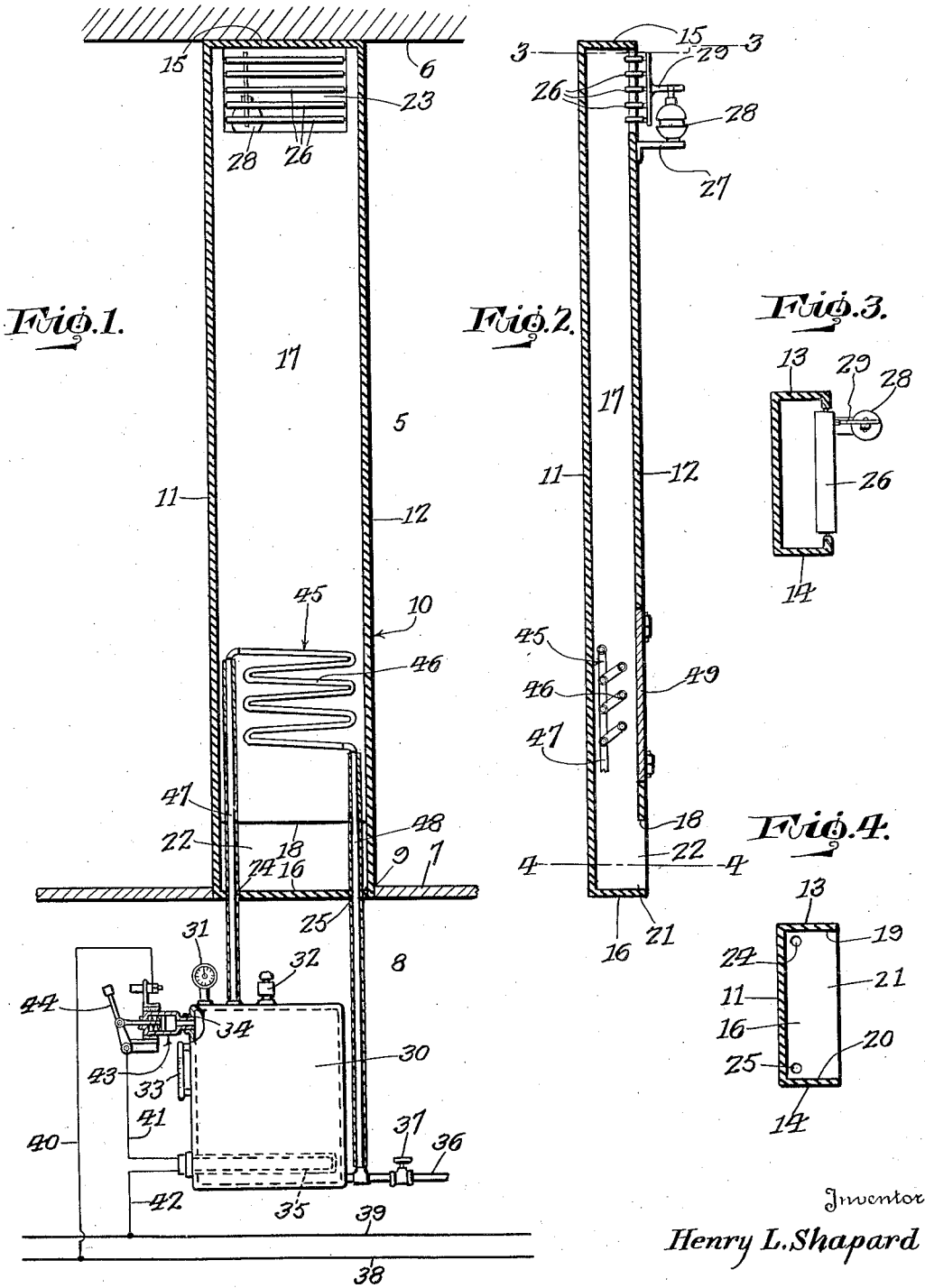
Inventor
*Henry L. Shapard*

Patented May 19, 1936

2,041,573

UNITED STATES PATENT OFFICE 2,041,573

TEMPERATURE GENERATING AND CONTROL SYSTEM

Henry L. Shapard, Missoula, Mont.

Application June 3, 1935, Serial No. 24,769

2 Claims. (Cl. 219—38)

This invention relates to a temperature generating and control system for use in connection with dwelling rooms, stores, storage rooms, refrigerating rooms, auditoriums, halls, but it is to be understood that a system, in accordance with this invention, may be used in any connection for which it may be found applicable, and the invention has for its object to provide, in a manner as hereinafter set forth, for automatically controlling the temperature of a chamber.

A further object of the invention is to provide, in a manner as hereinafter set forth, a temperature generating and control system for a chamber having the temperature of the latter controlled by a thermostat arranged within and controlled by the temperature within the chamber.

A further object of the invention is to provide, in a manner as hereinafter set forth, a temperature generating and control system including an electrically heated steam generating source of small capacity, an insulated air conducting means having an outlet and an inlet communicating with and discharging heated air into and intaking cool air from the chamber which is to have its temperature controlled, a thermostatic device for controlling the outlet of said conducting means positioned within and controlled by the temperature of said chamber, a heat radiating means within said conducting means for heating the air as it travels through said conducing means, a pair of valveless conducting pipes opening into said source, one for supplying dry steam from said source to and the other returning the products of condensation from said radiating means to said source, and a device for controlling the electrical heating of the steam generating source controlled by the pressure of steam within said source.

A further object of the invention is to provide, in a manner as hereinafter referred to, whereby temperature generating means of small capacity arranged within and at the center of a building is common to a plurality of chambers which are to have their temperature automatically controlled from the system.

A further object of the invention is to provide, in a manner as hereinafter set forth, whereby the system may be set up with a small amount of piping when employed in connection with a series of chambers and with the system including a temperature generating source of small capacity common to said piping.

Further objects of the invention are to provide, in a manner as hereinafter set forth, a temperature generating and control system which is simple in its construction, strong, durable, automatically controlled, economical in operation, readily installed for use in connection with a chamber which is to have its temperature controlled, controlled by the temperature of the room which it is used in connection with and comparatively inexpensive to set up.

With the foregoing and other objects which may hereinafter appear, the system consists of the novel arrangement, construction and combination of parts to be more specifically described and illustrated in the accompanying drawing wherein is shown an embodiment of the invention, but it is to be understood that changes, variations and modifications may be resorted to which fall within the scope of the invention as claimed.

In the drawing:

Figure 1 is a fragmentary view in horizontal section of a chamber and cellar showing the adaptation therewith of the system. The latter is shown in side elevation and partly in vertical section, Figure 2 is a vertical sectional view of the air conducting element taken at right angles to the showing of such element in Figure 1, and Figures 3 and 4 are sections on lines 3—3 and 4—4 respectively, Figure 2.

Referring to the drawing, 5 indicates a chamber, 6 and 7 respectively the ceiling and floor of the chamber, 8 a cellar or lower chamber and 9 an opening in floor 7.

The system includes a hollow air conductor 10, preferably of rectangular contour, constituting a temporator element and formed of non-conducting material. The element 10 includes a rear wall 11, a front wall 12, a pair of side walls 13, 14, a top wall 15 and a bottom wall 16. The wall 12 is of less length than wall 11. The latter extends from the top wall 15 to the bottom wall 16. The wall 12 extends from the top wall 15 to a point spaced from and above the bottom wall 16. The walls of element 10 provide an air passage 17 having an intake and an outlet to be referred to. The bottom edge 18 of wall 12 coacts with the lower front portions 19, 20 of side walls 13, 14 respectively and with the front marginal portion 21 of the upper face of bottom wall 16 to provide an intake 22 at the bottom of the front of element 10 for the passage 17. The upper portion of wall 12 is cut out to form an outlet 23 at the upper end of the front of element 10 for the passage 17. The intake 22 is of greater area than outlet 23. The top wall of outlet 23 is provided by the top wall 15 of element 10. The lower end of element 10 is arranged in and snugly engages with the walls of opening 9. The element 10 is of a length to extend from within opening 9 to the ceiling 6. The element 10 may be secured in any manner to ceiling 6 and floor 7. The bottom wall 16 of element 10 is formed with a pair of spaced parallel openings 24, 25 located in proximity to the ends thereof.

Arranged within the outlet 23 and pivotally supported from the front wall 12 is a series of superposed louvers 26 for varying the area of said outlet. Extending laterally from front wall 12, below and in proximity to outlet 23, is a bracket 27 for supporting a thermostatic device 28 which has attached thereto and operated thereby a shifting member 29 for the louvers 26. The member 29 is connected to the louvers in a manner to provide for the shifting of them in unison in a like direction.

The system also includes a steam generating boiler 30 of small capacity formed with a pressure indicator 31, a blow-off valve 32 which is employed when it is necessary to clean it, a normally closed door 33 to permit access thereto and an opening 34 near the upper end of one side thereof. Extending into the lower portion of boiler 30 from one side of the latter is an electrical heating element 35 for generating steam and connected to the lower portion of the other side of the boiler 30 is a controllable water supply pipe 36. The controlling means for pipe 36 may be of any desired form, automatically or manually operated and such means is shown, by way of example, as a valve structure indicated at 37. The circuit connections for the heater 35 are indicated at 38, 39, 40, 41 and 42. Electrically attached to the connections 40 and 41 is a steam pressure controlled heater circuit opening and closing mechanism 43 anchored to the wall of opening 34 and communicating with the interior of boiler 30 above the water line. The mechanism 43 is employed for opening the heater circuit when the predetermined desired high pressure is reached. The mechanism 45 automatically operates to close the heater circuit when the steam pressure falls below its predetermined high point. The water supply pipe 36 opens into boiler 32 below element 35. The circuit opening and closing member of mechanism 43 is designated 44 and is spring controlled.

The system further includes a heat radiating element 45 in the form of a set of superposed pipe coils 46, an insulated valveless dry steam supply pipe 47 extending from the top of boiler 30 to and opening into the upper coil of the set and an insulated valveless return pipe 48 for steam and condensates leading from the lower coil of said set to and opening into the water supply pipe 36 between controlling means 37 for the latter and boiler 30. The pipes 47, 48 extend through the openings 24, 25 respectively and act as a support for element 45. The latter is arranged in passage 17 above and in proximity to the top of intake 22.

The system provides for the transfer of heat from boiler to temporator and then released as thermostat control demands. The valveless supply and return pipes and the valveless heat radiating element provide for equal pressure on top and bottom connections with the boiler, steam being admitted to upper coil of radiator element in temporator starts back to boiler as the air flowing through temporator condenses steam. Pressure being equal, water finds its level and returns to boiler so that it makes it possible to determine water displacement, size of boiler necessary and electricity necessary to produce the desired results for first generating steam and second conditioning the temperature by controlling, in a manner referred to, air flow through the temporator.

The temperature of the chamber with which the system is associated will be controlled by thermostatic control of the louvers at the outlet 23.

Warm air, being lighter than cold air, will rise and by placing the radiator element in the lower portion of passage 17, it will cause a natural rapid circulation due to the upward draught in passage 17. The discharge of the heated air in the chamber is controlled by varying the area of outlet 23 on the shifting of the louvers by the thermostatic device which is controlled by the temperature of the chamber.

The system may be employed for refrigerating purposes by substituting a refrigerant forcing mechanism for the boiler, positioning the intake at the upper end and the outlet at the lower end of the temporator and increasing the length of the supply and return pipes to position the radiator element near the intake.

The element 10 has a removable section or door 49 at its front to enable the positioning of element 45 therein.

Preferably the element 45 will be arranged about eighteen inches above the top of the intake 18.

What I claim is:

1. In a temperature generating and control system, a steam generating boiler of small capacity, an electric heater positioned within and in proximity to the bottom of the boiler, a controllable water feed line opening into the boiler below the heater, a temporator for and adapted to be positioned within a chamber, said temporator formed of non-conducting material providing a heated air conducting passage and having an intake at its lower portion and an outlet at its upper portion, said outlet and intake opening into said chamber, thermostatic controlled means carried by the temporator and controlled by the temperature in said chamber for varying the area of said outlet, a valveless heat radiating element positioned in the temporator above said intake, a valveless insulated steam conducting pipe leading from the boiler to said element, a valveless insulated return pipe leading from said element to said water feed line between its controlling means for the latter and the boiler, and a heater circuit having interposed therein a steam pressure controlled circuit opening and closing mechanism opening into the boiler, said temporator having spaced openings in its bottom, said pipes extending upwardly through said openings and suspending the radiating element within and in spaced relation to the inner face of the temporator.

2. In a temperature generating and control system, an upstanding temporator for and adapted to be positioned within a chamber, said temporator formed of non-conducting material having an intake and an outlet opening into the chamber and with the outlet arranged above the intake, said temporator corresponding in height to that of the chamber and constituting a heated air conducting passage, thermostatic controlled means carried by the temporator and controlled by the temperature of the chamber for varying the area of said outlet, a steam generating boiler of small capacity, an electric heater for the boiler, a controllable water feed line opening into the boiler, a valveless heat radiating element formed of a set of superposed coils positioned in the temporator above the intake, a valveless insulated steam conducting pipe leading from said boiler to the upper coil of the set, a valveless insulated return pipe leading from the lowermost coil of said set to said water feed line, and a heater circuit having interposed therein a steam pressure controlled circuit opening and closing mechanism opening into the boiler, said temporator having spaced openings in its bottom, said pipes extending upwardly through said openings and suspending the radiating element within and in spaced relation to the inner face of the temporator.

HENRY L. SHAPARD.